United States Patent [19]

Hansen

[11] 4,223,824

[45] Sep. 23, 1980

[54] METHOD OF MULTI-BEAD WELDING OF TWO WORKPIECES AND APPARATUS FOR CARRYING OUT THE METHOD

[75] Inventor: Erik Hansen, Gentofte, Denmark

[73] Assignee: Burmeister & Wain A/S, Copenhagen, Sweden

[21] Appl. No.: 30,438

[22] Filed: Apr. 16, 1979

[30] Foreign Application Priority Data

Dec. 19, 1978 [DK] Denmark ............................. 5700/78
Jan. 11, 1979 [DK] Denmark ............................. 124/79

[51] Int. Cl.³ ............................................. B23K 9/12
[52] U.S. Cl. ................................. 228/102; 219/60 R; 219/73.2; 219/125.11; 219/125.12; 228/7; 228/41; 228/48; 228/225
[58] Field of Search .............. 228/102, 225, 244, 7, 228/41, 48; 219/60 R, 73.2, 125.11, 125.12

[56] References Cited

U.S. PATENT DOCUMENTS

| 4,086,690 | 5/1978 | Bernasconi | 228/48 X |
| 4,175,227 | 11/1979 | Kasper | 219/125.12 |
| 4,179,059 | 12/1979 | Chang et al. | 219/125.11 |

FOREIGN PATENT DOCUMENTS

| 52-34013 | 9/1977 | Japan | 219/125.12 |
| 52-46902 | 11/1977 | Japan | 219/125.12 |
| 53-19459 | 6/1978 | Japan | 219/125.12 |

Primary Examiner—Francis S. Husar
Assistant Examiner—Kenneth J. Ramsey
Attorney, Agent, or Firm—Bacon & Thomas

[57] ABSTRACT

An apparatus for multi-bead welding of two rotating workpieces comprises a flat filler wire holder which can be introduced into the gap between the workpieces and which is periodically pivoted forth and back at substantially constant angular velocity between the two sides of the gap. The pivoting is effected by a motor which is started when a cam rotating in synchronism with the workpieces actuates a stationary signal generator. The cam is provided on a cam disc which is driven through a friction coupling and which, on each revolution, is arrested by a pawl during a period determined by an adjustable timer. The timer is started when the cam actuates a stationary signal generator mounted shortly in advance of the pawl, and after the expiry of the period of the timer the pawl is retracted so that the rotation of the cam disc can continue. The pawl is again advanced to operative position when the cam actuates the first mentioned signal generator.

10 Claims, 5 Drawing Figures

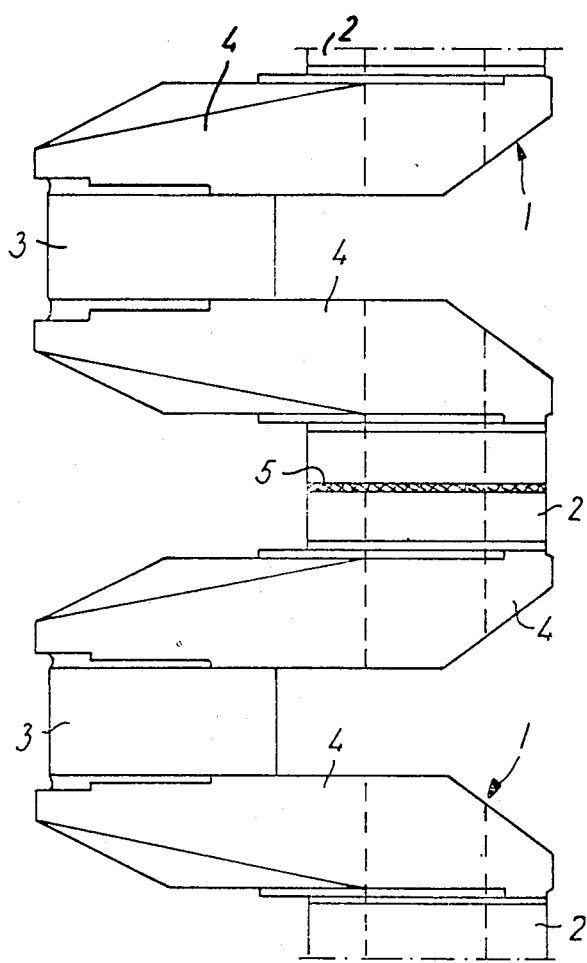
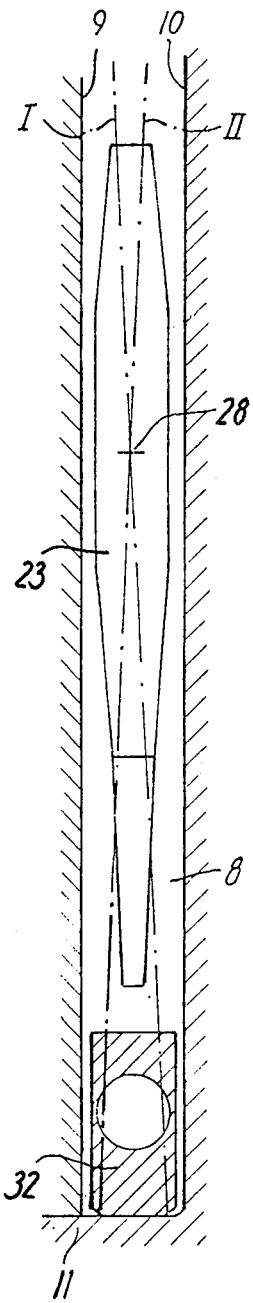
FIG. 1
FIG. 4

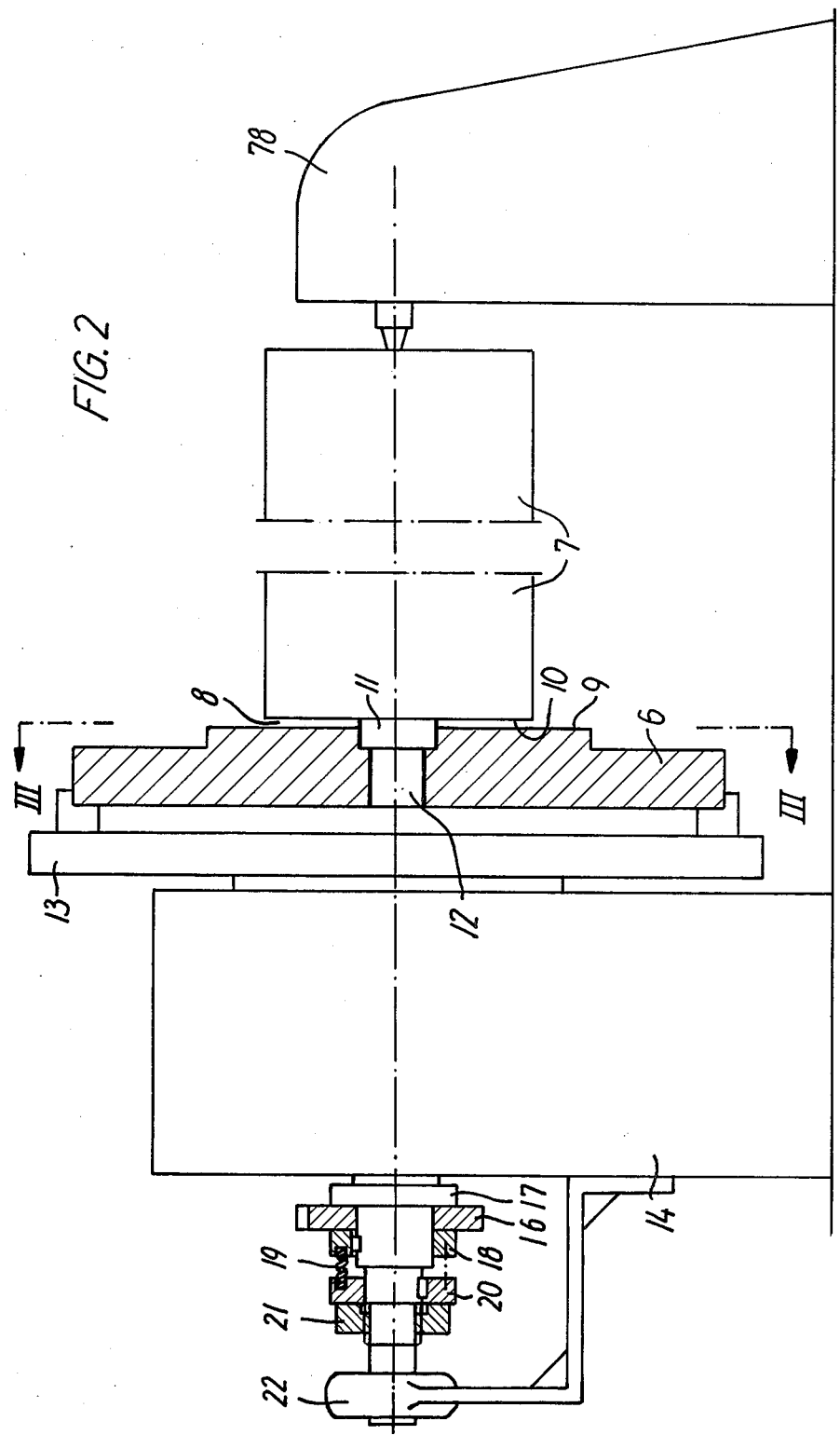

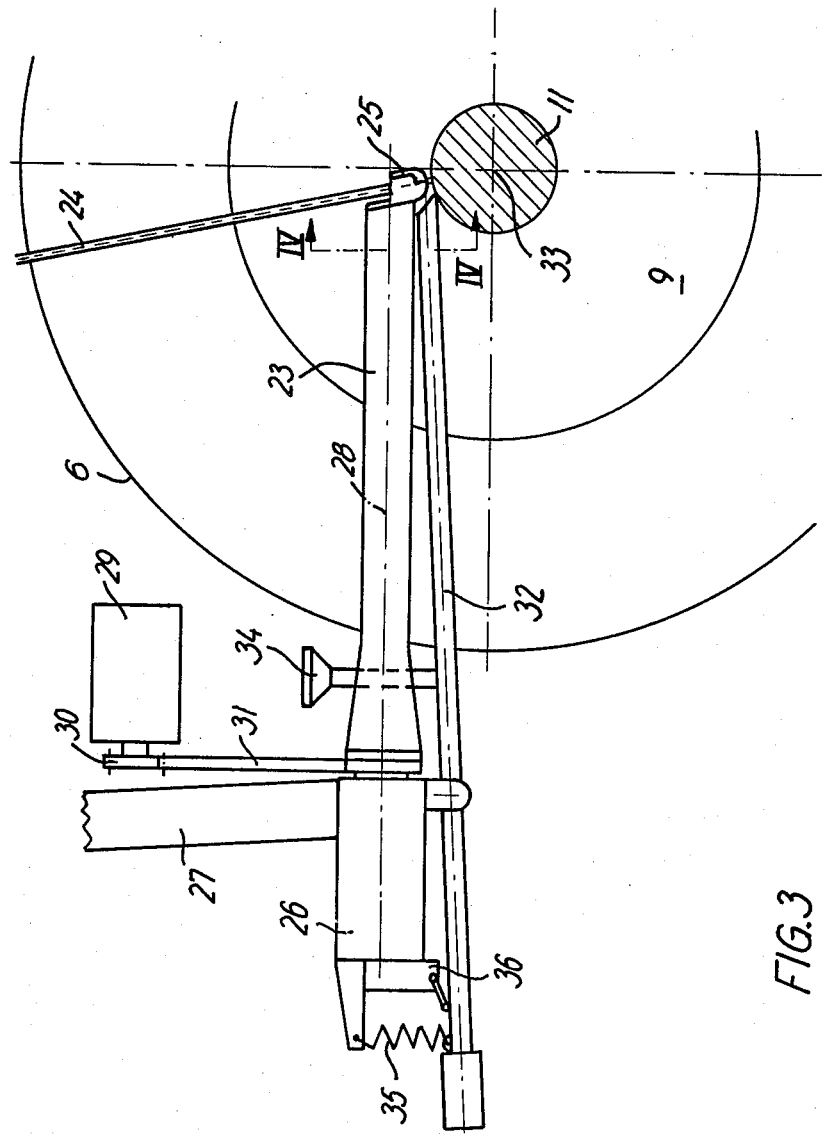

METHOD OF MULTI-BEAD WELDING OF TWO WORKPIECES AND APPARATUS FOR CARRYING OUT THE METHOD

BACKGROUND OF THE INVENTION

The present invention relates to a method of multi-bead welding of two workpieces which are caused to rotate about a common center line while a holder for a filler wire is periodically pivoted forth and back between one and the other side of the gap defined between opposed, parallel or substantially parallel end faces of the workpieces.

With a method of this kind a relatively narrow welding gap can, by means of single filler wire or electrode, be filled up by two beads placed as corner weldes in either side of the gap and with partial overlapping of the welds. It is known to effect the periodic pivoting of the filler wire holder manually which, however, is troublesome and strenuous because it requires the full attention of the operator and because of the heat dissipation from the welding position. The manual pivoting of the holder is made further difficult if the diameter of the workpieces is large and if the welding gap is deep.

SUMMARY OF THE INVENTION

According to the present invention there is provided a method of multi-bead welding of two workpieces, which are caused to rotate about a common center line while a holder for a filler wire is periodically pivoted forth and back between one and the other side of a gap defined between opposed, parallel or substantially parallel end faces of the workpieces, wherein the improvement consists in that the holder is pivoted mechanically at a constant or substantially constant angular velocity, and in that each pivoting movement is initiated by a starting signal which is automatically generated when the workpieces have rotated 360° or substantially 360° after the termination of the previous pivoting movement in the opposite direction.

There has thus been provided a welding method which regardless of the shape and size of the workpieces ensures a perfect weld with uniform overlap at each shift from one side of the gap to the other, due to the constant angular velocity of the pivoting holder, and unaffected by the decreasing angular velocity of the workpieces as the radius to the welding position increases. The constant angular spacing between the termination of each pivoting movement and the beginning of the next ensures, in like manner, the correct mutual location of the successive overlaps irrespective of the varying angular velocity of the workpieces and at any values of the chosen, preferably constant, welding speed.

The invention also provides an apparatus for carrying out the novel method and comprising means for supporting the two workpieces, means for rotating the workpieces about a common center line, and a holder for a mechanically advancing filler wire which holder is pivotable about a transverse axis, characterized in that the holder is mechanically connected to a drive motor adapted to pivot the holder forth and back about said axis through a predetermined angle and at constant angular velocity, that an actuator adapted to generate a starting signal to the drive motor is connected to the rotating workpieces through a friction coupling, and that the apparatus comprises a stop member, which after each revolution of the actuator stops the rotation thereof during a period of predetermined duration and subsequently releases the rotation.

With an apparatus of this construction there occurs, for each revolution of the workpieces, a delay of the starting signal to the drive motor equal to the period during which the actuator is at a standstill, and when the duration of that period corresponds to the time which the holder needs for pivoting between its end positions, one obtains the desired successive angular staggering of those parts of the continuous weld seam which extend obliquely from one side of the weld to the opposite.

In a preferred and structurally simple embodiment the actuator is mounted on a cam disc, and the stop member is a pawl cooperating with a cam on the disc and arranged between two stationary signal generators actuated by the actuator, the first signal generator, as seen in the direction of rotation, starts a timer, which after its period has run out creates a signal to displace the pawl to inoperative position while the second signal generator creates a signal to start the drive motor and a signal to displace the pawl to active position.

The double function of the second signal generator, viz, to start the drive motor and to reset the pawl, can be effected by connecting an output signal line from the timer and a signal line from the second signal generator, via an OR-gate, to the input of a flip-flop, the outputs of which control the displacement of the pawl between operative and inoperative position.

The structure can be further simplified by forming the cam as actuator of the signal generators.

The apparatus may comprise a signal line which connects the input of the timer with the non-inverting input of a NOT-gate, the inverting input of which is connected to one or more manually actuated signal generators for controlling the welding operation, while its output is connected to the output of the timer. The embodiment is particularly advantageous in a situation where the welding is temporarily interrupted by means of one of said manual signal generators while the workpieces continue to rotate. The flip-flop will then retract the pawl to inoperative position already in response to the actuation of the first of the two signal generators arranged along the cam disc because the output signal of that generator by-passes the timer, and consequently the cam disc continues to rotate in synchronism with the workpieces without delay so that the first shift after re-starting of the welding operation occurs at the correct location relative to the preceding shift. During the interruption the pawl carries out one double stroke between operative and inoperative position at each revolution of the workpieces, and hence the control of the pawl is also uneffected by the interruption.

The manually actuated signal generator or generators may be connected to one input of an AND-gate, the other input of which is connected to the second signal generator while its output is connected to a second flip-flop, the outputs of which control the energy supply to the drive motor for either of the directions of rotation of the motor. This ensures that the drive motor of the holder can be started automatically only when the function or functions controlled by the manual signal generators are switched on. In particular it is thus possible to initiate one or more successive pivoting movements of the holder manually, if desired.

For obtaining this function the apparatus may comprise an OR-gate between the output of the AND-gate and the second flip-flop, which OR-gate has its output connected to the flip-flop, one input connected to the output of the AND-gate, and its other input connected to a manually actuated pulse signal generator for starting the drive motor when the automatic control has been switched off.

The apparatus may comprise a sensor, which is actuated by the holder in the central position thereof, and which via a manually actuated switch is connected to a control means for interrupting the energy supply to the drive motor and for locking the holder in the central position. By means of the manually controlled switch the operator can fix the filler wire in the center of the gap width.

BRIEF DESCRIPTION OF THE DRAWINGS

The invention will now be described in more detail with reference to the partially schematic drawings, in which FIG. 1 is an elevation of two crank throws which have been welded together by the method of the invention, FIG. 2 is an elevation of two different workpieces which can be welded together by the method of the invention, and which have been shown set up in a rather schematically illustrated apparatus embodying the invention, FIG. 3 is a section on a larger scale through the welding gap in the arrangement of FIG. 2, shown as a section along line III—III of FIG. 2, and with certain components of the apparatus omitted for the sake of clarity, FIG. 4 is a section through the welding gap and the filler wire holder along line IV—IV of FIG. 3, shown on a still larger scale.

DETAILED DESCRIPTION

Figure 5:
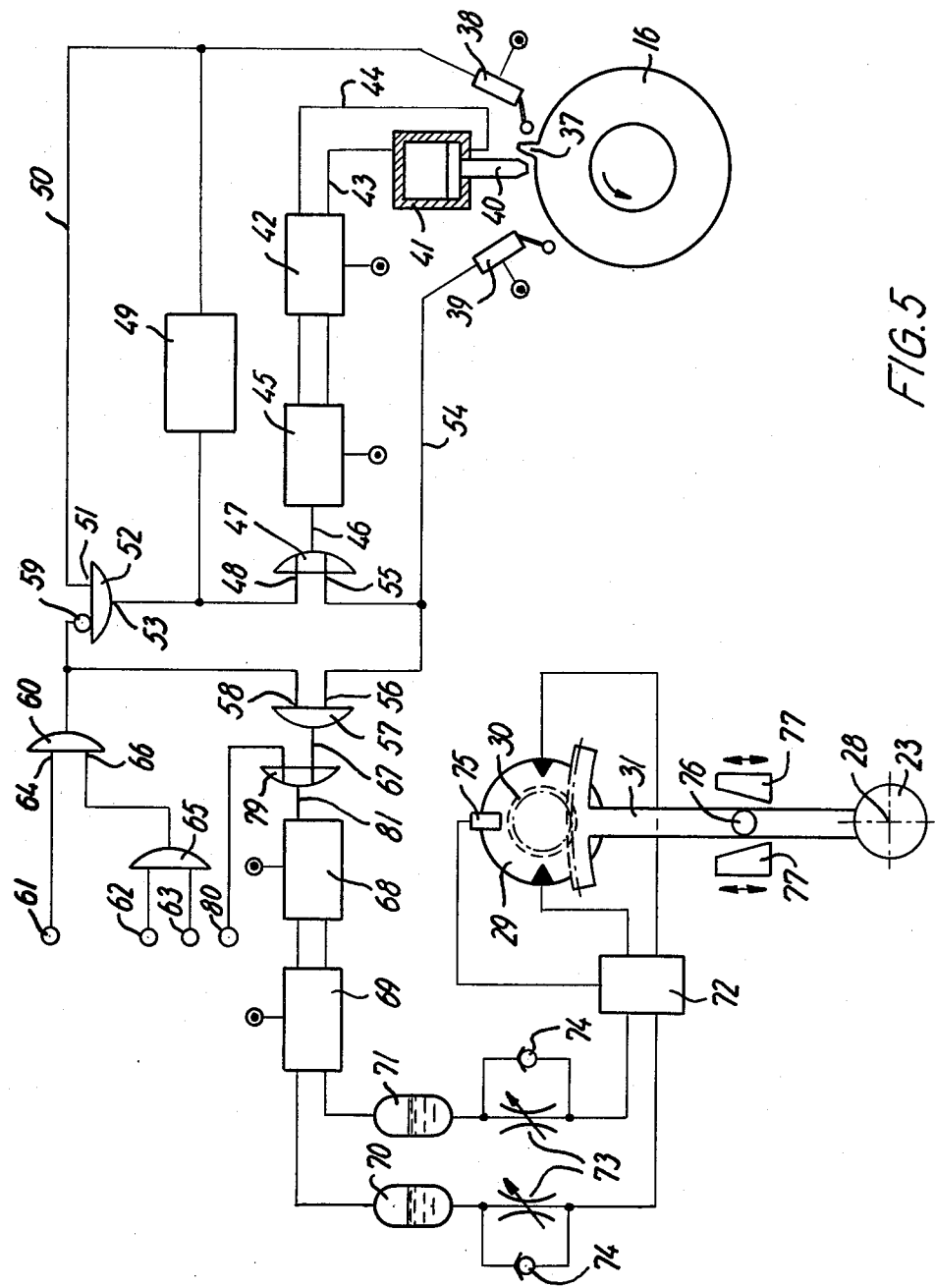
FIG. 5 is a diagram of a pneumatic-hydraulic control system for the apparatus of FIGS. 2–4.

FIG. 1 shows two crank throws 1 comprising main bearing journals 2, crank pins 3 and crank arms 4. The two throws have been welded together by means of a welding seam 5 located midway of the length of the common main journal 2. Before the welding is carried out, the workpieces may be temporarily joined and centered by means of a ring, not shown, which is tack-welded in the central bore of the journal and which may be removed after the welding operation, if desired. During the welding the two throws 1 rotate about the common center line of journal 2, and the welding can be carried out by means of an equipment which in principle corresponds to that described below.

In FIG. 2 there is shown a flange 6, which is to be welded to a shaft 7 by means of a multi-bead weld in the relatively narrow and deep gap 8 between the opposed end faces 9 and 10 of the workpieces. Before being welded the workpieces are centered by means of a short stud 11 located in extension of shaft 7, and the surface of which forms the bottom of gap 8. Stud 11 may be tack-welded to flange 6 in the central bore 12 thereof.

As shown, flange 6 is clamped in a jaw chuck 13 secured to the main spindle of a headstock 14. Rotation of the main spindle is effected through a drive mechanism (not shown), which is enclosed within headstock 14, and which preferably includes an infinitely variable gear. The end of shaft 7 remote from flange 6 is supported by means of a tailstock 78. Intermediate its ends shaft 7, may, if necessary, be additionally supported at one or more locations (not shown).

To the rear end of the main spindle there is secured a drive shaft 15 projecting from headstock 14. Shaft 15 supports a rotatable cam disc 16 which can be entrained by friction against a flange 17 on the shaft and an axially movable friction disc 18 which is connected to shaft 15 for rotation therewith. The friction disc is biased against cam disc 16 by means of springs 19 acting between the friction disc and a thrust ring 20 which rotates in unison with shaft 15 and is axially displaceable relative thereto. The spring force can be adjusted by means of a nut 21.

The outer end of shaft 15 extends through a stationary housing 22 secured to the rear side of headstock 14 and containing contact means for supplying welding current through shaft 15.

FIGS. 3 and 4 show a holder 23 for the filler wire employed for the welding, which wire is fed from a supply spool not shown to the welding position within gap 8 through a tube 24. At the welding position the wire is led through a spring-loaded jaw 25 at the front end of holder 23. At least that part of holder 23, which at the beginning of the welding operation (see FIGS. 3 and 4) is located entirely within the gap, has such transverse dimensions that the holder can pivot between the two end positions I and II shown in FIG. 4 without colliding with the two end faces 9 and 10. That part of holder 23, which projects outside workpiece 6, is journalled in a bearing 26 on a slide 27, which is vertically reciprocable relative to a carriage (not shown). This carriage is mounted on a frame (not shown), which is displaceable in the axial direction of the workpieces along a bedplate on which headstock 14 is secured and along which tailstock 78 is displaceable in the direction of the common center line and axis of rotation 33 of workpieces 6 and 7. The displacement of said frame carrying the components of the apparatus, which effect the welding operation proper, serves for positioning said components relative to welding gap 8.

The pivoting of holder 23 between said end positions I and II occurs about a longitudinal axis 28 which in FIG. 3 is shown horizontal, and is effected by a hydraulic motor 29 mounted on slide 27. The output shaft of the motor carries a pinion 30 engaging with a toothed sector 31 secured to holder 23, see also FIG. 5.

Below holder 23 a pipe 32 for feeding welding powder or a protective gas is hinged to bearing 26 about an axis parallel to the common center line 33 of workpieces 6 and 7. Welding powder may be supplied from a receptacle, not shown, on slide 27 through a hopper 34 to the interior of pipe 32, where it is conveyed forward to the welding position by means of a motor-driven auger. Under the influence of a spring 35 acting on the rear end of pipe 27, the front end of the pipe is kept in engagement with the surface of stud 11 before the welding operations commences and subsequently with the surface of successively growing weld. The rear end of pipe 32 actuates a switch 36 which may control the upward movement of slide 27 from which the change of the rpm. of the workpieces in timed relationship with the progress of the welding operation is derived.

Motor 29 is controlled by the system illustrated in FIG. 5, the functions of the system being derived from a cam 37 on the periphery of cam disc 16 which in sequence actuates two pneumatic signal generators 38 and 39. Between the signal generators there is provided a pawl 40 against which cam 37 abuts when the pawl is in its operative position as shown in FIG. 5 whereby the rotation of the cam disc is stopped. Pawl 40 is secured to the piston of a pneumatic ram 41, the two opposed working chambers of which are supplied with pressurized air through a switch valve 42 and two lines 43 and 44. The position of switch valve 42 is determined by a pneumatic flip-flop 45, which receives its input signal to switch the valve through an output signal line 46 from a pneumatic OR-gate 47. One input 48 of gate 47 is connected to signal generator 38 through an adjustable timer 49. A further signal line 50 leads from signal generator 38 to the non-inverting input 51 of a NOT-gate 52, the output 53 of which is connected to input 48.

Through a signal line 54 signal generator 39 is connected to the other input 55 of OR-gate 47 and also to one input 56 of an AND-gate 57. The other input 58 of gate 57 is connected to the inverting input 59 of NOT-gate 52 and to the output of an AND-gate 60.

The apparatus comprises three schematically shown signal generators 61, 62, and 63 which are related to the execution of the welding operation and which may e.g. be manually operated switches for closing and breaking the welding current, for switching between manual and automatic pivoting of electrode wire holder 23, and for switching between automatic pivoting and locking of the holder in its central position within the welding gap, respectively. Signal generator 61 is connected to one input 64 of AND-gate 60 while the two other signal generators are connected to one each of the inputs of an AND-gate 65, the output of which is connected to the other input 66 of gate 60.

Through a signal line 67 the output of AND-gate 57 is connected to one input of an OR-gate 79. A signal can be delivered to the other input of OR-gate 79 from a manually operated signal generator 80 which may be a pulse valve actuated by a push-button. Signal generator 80 is actuated to generate an output signal when it is desired to initiate a mechanical pivoting of holder 23 by means of switches 62 and 63 after the automatic control of the apparatus has been switched off. During the normal, automatically controlled welding process no output signal is delivered by signal generator 80. Through a signal line 81 the output of OR-gate 79 is connected to a pneumatic flip-flop 68, the two outputs of which control a pneumatic switch valve 69 which dependent on the position of the flip-flop supplies pressurized air to one of two pneumatic-hydraulic pressure converters 70 and 71 and simultaneously connects the air chamber of the other pressure converter to the atmosphere.

Through a double stop valve 72 the liquid chambers of the pressure converters 70 and 71 are connected to one each of the two working chambers of the hydraulic motor 29. Between each pressure converter and valve 72 there is interposed a variable throttle valve 73 which is by-passed through a check valve 74 permitting flow from the pressure converter in question to the motor, but not from the motor to the pressure converter.

In connection with the output shaft of motor 29 there is provided a sensor 75, which can transmit a signal to stop valve 72 when sector 31 and hence the filler wire holder 23 assumes its central position, and this signal can activate valve 72 to block the connection between the working chambers of motor 29 and the pressure converters 70 and 71 if the previously mentioned, manually actuated signal generator 63 is set to lock holder 23 in the central position.

During normal operation of the apparatus when signal generators 61–63 are set to welding and automatic pivoting of holder 23 forth and back, the control of the pivoting of the holder occurs as follows.

In the position of cam disc 16 shown in FIG. 5 holder 23 assumes one of its end positions I and II. Cam 37 has just actuated signal generator 38 whereby a pneumatic pulse has been delivered to timer 49 which has thereby been started, and to input 51 of NOT-gate 52. Since a signal also is present at the inverting input 59 of that gate, there is no signal at output 53.

When cam 37 abuts on the advanced pawl 40, cam disc 16 is stopped while the workpieces 6 and 7 continue to rotate. Pawl 40 is retracted to liberate the cam disc at the moment when the period of timer 49 has expired so that a signal is transmitted to input 48 of OR-gate 47 and onwards to flip-flop 45, which switches valve 42 and thus supplies pressurized air through line 44 to the lower face of the piston of the pawl.

When cam 37 subsequently actuates signal generator 39 this generator transmits a pneumatic signal pulse through line 54 to input 55 of OR-gate 47 whereby a signal is again delivered to flip-flop 45 which switches valve 42 and thus through line 43 moves pawl 40 back to its operative position as shown.

The signal pulse from signal generator 39 also proceeds to input 56 of AND-gate 57, and since a signal also occurs at inputs 58, flip-flop 68 receives a signal through control line 67, OR-gate 79, and line 81, whereby it switches valve 69 so that pressurized air is supplied to one of the pressure converters, e.g. converter 70. From that pressure converter the liquid flows through the associated check valve 74 to one working chamber of motor 29, while hydraulic fluid from the other working chamber of the motor flows back to pressure converter 71 through the associated throttle valve 73. The adjustment of the throttle valve determines the velocity at which the hydraulic liquid can flow out and thus the angular velocity of the motor and of holder 23.

When cam 37 next time actuates signal generator 38, timer 49 is restarted and after the expiry of the timer period pawl 40 is retracted so that the temporarily arrested cam disc 16 starts rotating again. When cam 37 then actuates signal generator 39, a signal is again, as described above, transmitted to flip-flop 68 which switches valve 69, this time for rotation of motor 29 in the opposite direction of rotation.

If a signal is not present from all of the manually actuated signal generators 61–63, no signal is present either at input 59 of NOT-gate 52 and in that case flip-flop 45 receives a signal, which through valve 42 provokes the withdrawal of pawl 40 as soon as signal generator 38 has been actuated, i.e. at a moment when cam 37 has not yet arrived at the pawl. As previously the subsequent actuation of signal generator 39 by the cam releases a signal to flip-flop 45 which returns the pawl to operative position.

It will be seen that the delay of cam disc 16, which in principle shall correspond to the time, which motor 29 requires for pivoting holder 23 from one end position thereof to the opposite, is not exactly constant and equal to the period of timer 49 because the timer is started by signal generator 38 slightly before the cam disc is arrested due to the abutment of cam 37 against pawl 40. In practice it is possible to reduce the spacing between signal generator 38 and pawl 40 to such a low value that the variation—due to said spacing—of the standstill period of the cam disc becomes of no practical importance. This variation is related to the varying angular velocity of the workpieces and hence of the cam disc during the welding operation.

The two end positions of holder 23 can be determined by the stop 76 shown in FIG. 5 which is provided on the toothed sector 31 and which in either end position of the arm abuts against one of two wedge-shaped stops 77. These stops may be vertically displaceable as shown with arrows whereby the magnitude of the angular deflection of the holder can be varied.

By means of the manually actuated signal generator 80, which transmits a signal pulse to one input of OR-gate 79, the output of which is connected to flip-flop 68, it is possible, when the automatic control has been switched off, to start motor 29 manually for pivoting holder 23 when the filler wire assumes an optional position along the periphery of the workpieces.

Besides for welding crankshafts and thrust shafts with large flanges, as shown, the apparatus described is also suited e.g. for welding large vessel shells of considerable plate thickness, e.g. from 50 mm upwards.

While the drive motor 29 of the filler wire holder has been shown on the drawings as a rotary piston motor, it would evidently also be possible to employ a reciprocating hydraulic motor or an electric motor. The control, which in the example shown is pneumatic, could also be effected with electronic components.

I claim:

1. A method of multi-bead welding of two workpieces, comprising:
    supporting said workpieces for rotation about a common center line and such that a gap is defined between substantially parallel opposed end faces of said workpieces,
    causing said workpieces to rotate in unison about said common center line,
    introducing a holder for a filler wire into said gap,
    mechanically advancing a filler wire through said holder into said gap,
    periodically pivoting said holder together with said filler wire forth and back between one and the other side of said gap at a substantially constant angular velocity,
    after each pivoting movement maintaining said holder stationary in its end position as reached thereby, during a period in which said workpieces rotate substantially 360°,
    and after the expiry of each said period generating a signal for initiating a pivoting movement of said holder to its opposite end position.

2. Apparatus for effecting a multi-bead welding of two workpieces, comprising:
    means supporting said workpieces for rotation about a common center line and such that a gap is defined between substantially parallel opposed end faces of said workpieces,
    means for rotating said workpieces in unison about said common center line,
    a holder for a filler wire and means for mechanically advancing a filler wire through said holder towards a welding position within said gap,
    means supporting said holder for pivoting about an axis transverse to said common center line,
    a drive motor operatively connected to said holder for pivoting it forth and back about said transverse axis through a predetermined angle and at substantially constant angular velocity,
    an actuator connected to said workpieces through a friction coupling for rotation therewith and adapted to generate a starting signal to said drive motor at a predetermined angular position of said actuator,
    a stop member and drive means for shifting said stop member between an operative position in which it prevents the rotation of said actuator, and an inoperative position in which the actuator is free to rotate,
    and control means operatively connected to said stop member for causing it to stop rotation of said actuator each time the actuator has completed one full revolution and to subsequently release the rotation of the actuator after the expiry of a period of substantially constant duration.

3. Apparatus as claimed in claim 2, wherein said control means comprises
    a first stationary signal generator and a second stationary signal generator spaced therefrom, said signal generators being mounted for actuation in succession by said actuator,
    a timer connected through an input signal line to said first signal generator so as to be started in response to the actuation of said signal generator, and connected through an output signal line to said stop member drive means so as to cause shifting of the stop member to its inoperative position in response to a signal delivered by the timer when the timer period has run out,
    and signal transmission means from said second signal generator to said holder drive motor and to said stop member drive means so as to cause shifting of the stop member to its operative position and start of the holder drive motor in response to the actuation of said second signal generator.

4. Apparatus as claimed in claim 3, wherein said actuator is formed as a cam projecting from a rotary cam disc for direct engagement with said stop member.

5. Apparatus as claimed in claim 3 comprising an OR-gate with two inputs connected to said output signal line of the timer and to an output signal line of the second signal generator, respectively, and an output connected to the input of a flip-flop having two outputs connected to said stop member drive means.

6. Apparatus as claimed in claim 5, further comprising a NOT-gate having a non-inverting input connected by a signal line to the input of said timer, an inverting input connected to at least one manually actuated signal generator for controlling the welding process, and an output connected to the output of said timer.

7. Apparatus as claimed in claim 6, wherein the connection between said manually actuated signal generator and the inverting input of said NOT-gate includes an AND-gate, one input of which is connected to said manually actuated signal generator while its other input is connected to said second signal generator, and its output is connected to a second flip-flop, the outputs of which control the energy supply to said holder drive motor for either of the directions of rotation of said motor.

8. Apparatus as claimed in claim 7 further comprising an OR-gate, one input of which is connected to the output of said AND-gate, while its other input is connected to a manually actuated pulse signal generator for starting said holder drive motor after switching off the automatic control of the welding process, and its output is connected to said second flip-flop.

9. Apparatus as claimed in claim 2, further comprising a sensor mounted for actuation by said holder in a central position thereof and connected through a manually actuated switch to control means for interrupting the energy supply to said holder drive motor and locking the holder in said central position.

10. Apparatus as claimed in claim 9, wherein said holder drive motor is a fluid motor, and said control means is constituted by two stop valves, each interposed in a separate duct for supplying fluid to said motor.

* * * * *

UNITED STATES PATENT OFFICE
CERTIFICATE OF CORRECTION

Patent No. 4,223,824      Dated September 23, 1980

Inventor(s) ERIK HANSEN

It is certified that error appears in the above-identified patent and that said Letters Patent are hereby corrected as shown below:

In the above patent, line [73] should read:

--Assignee: Burmeister & Wain A/S,
            Copenhagen, Denmark --

Signed and Sealed this

Twenty-third Day of December 1980

[SEAL]

Attest:

SIDNEY A. DIAMOND

Attesting Officer     Commissioner of Patents and Trademarks